(12) United States Patent
Jepson et al.

(10) Patent No.: US 8,090,978 B2
(45) Date of Patent: Jan. 3, 2012

(54) PROTECTION OF DATA ON FAILING STORAGE DEVICES

(75) Inventors: Raymond Jepson, Chandlers Ford (GB); Timothy F. McCarthy, Eastleigh (GB); Roderick G. C. Moore, Bournemouth (GB); Jonathan I. Settle, Southampton (GB); Jonathan W. L. Short, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/749,433

(22) Filed: Mar. 29, 2010

(65) Prior Publication Data

US 2010/0299555 A1    Nov. 25, 2010

(30) Foreign Application Priority Data

May 29, 2009   (EP) .................................... 09161492

(51) Int. Cl.
*G06F 11/00* (2006.01)
(52) U.S. Cl. ..................................................... 714/6.13
(58) Field of Classification Search .................. None
See application file for complete search history.

(56) References Cited

U.S. PATENT DOCUMENTS

| | | | | |
|---|---|---|---|---|
| 7,308,603 | B2 * | 12/2007 | Carver et al. ............. | 714/6.13 |
| 7,509,525 | B2 * | 3/2009 | Kleiman et al. ............ | 714/6.2 |
| 7,853,823 | B2 * | 12/2010 | Deenadhayalan et al. ... | 714/6.12 |
| 2008/0022157 | A1 * | 1/2008 | Chang et al. ............... | 714/42 |
| 2008/0155315 | A1 * | 6/2008 | Gunda et al. ............... | 714/8 |
| 2009/0196417 | A1 * | 8/2009 | Beaver et al. .............. | 380/45 |
| 2009/0287956 | A1 * | 11/2009 | Flynn et al. ................ | 714/6 |

* cited by examiner

*Primary Examiner* — Christopher McCarthy
(74) *Attorney, Agent, or Firm* — Griffiths & Seaton PLLC

(57) ABSTRACT

A management apparatus operable for protecting data on a failing storage device in a data processing system including a storage array having at least one of a plurality of storage devices. The management apparatus includes a receiver component for receiving a failure message indicating that the plurality of storage devices comprises the failing storage device. An analyzer component is in communication with the receiver component and responsive to receipt of the failure message, for analyzing the failure message. A sender component is in communication with the analyzer component. The sender component is adapted for, in response to the analyzer component determining the failing storage device, sending a zoning message, the zoning message instructing the storage array to isolate the failing storage device, and sending a protect message. The protect message instructs the storage array to protect data on the failing storage device.

14 Claims, 6 Drawing Sheets

PROTECTION OF DATA ON FAILING STORAGE DEVICES

CLAIM TO FOREIGN PRIORITY

This application claims priority to European Patent Application No. 09161492.5, filed May 29, 2009, and entitled "An Apparatus, Method and Computer Program for Protecting Data on Failing Storage Devices."

BACKGROUND OF THE INVENTION

1. Field of the Invention

The present invention relates in general to computers, and more particularly to apparatus, method and computer program product embodiments for protecting data on failed storage devices in a computing storage environment.

2. Description of the Related Art

Storage subsystems comprise a plurality of storage devices, with which attached computing equipment may co-operate. Typically, storage devices are configured into an array network. Arrays may be configured as Just a Bunch of Disks (JBOD) devices, or Redundant Array of Inexpensive Disks (RAID) devices. RAID provides a method whereby storage reliability, capacity and availability may be built into a storage subsystem using low cost storage devices using storage device arrays with inbuilt redundancy. RAID may come in many forms depending on the relative trade off requirements of reliability, capacity and availability of data.

SUMMARY OF THE INVENTION

Storage devices may fail for many different reasons, with varying degrees of failure. Typically, storage devices do not fail completely, allowing some data to be recovered from a failed device. Failure of such storage devices may be tolerated in typical storage subsystems, because the data on a failing device may be recovered from the non-failing storage devices if the storage subsystem provides storage redundancy.

Once a failed storage device is no longer required in the storage subsystem, the failed storage device is often physically removed. However, in this event, data owners may want to protect any remaining data on the storage device, especially if the storage device is leaving their premises. One method to protect the information is to erase the data, or to overwrite the data before the storage device is taken off the premises. Another method is through cryptographic techniques. Disk encryption allows information to be protected through hardware or software cryptographic techniques. Disk encryption provides a technique to protect data by encrypting the storage device surface media and also provides a technique to cryptographically erase this media to delete any customer data. Cryptographic erasure is typically achieved through the replacement of the encryption keys that were used to encrypt the data.

However, in the event of a storage device failure, a typical storage subsystem protects the rest of the subsystem by bypassing the failed storage device from the subsystem and preventing any potential perturbance and, typically, preventing I/Os involving the failed device in order to avoid corruption of data. A failing storage device may cause network issues that may affect the availability of the other disks in the array. When the storage device is bypassed no access may safely be given to the storage device to delete any data on the storage device. Therefore, there is a need in the art to address the aforementioned problem.

In view of the foregoing, various embodiments for protecting data on failed storage devices in computing storage environments are provided. In one embodiment, by way of example only, a management apparatus is operable for protecting data on a failing storage device in a data processing system inclusive of a storage array having at least one of a plurality of storage devices. The management apparatus comprises a receiver component for receiving a failure message indicating that the plurality of storage devices comprises the failing storage device. The management apparatus further comprises an analyzer component, responsive to receipt of a failure message, for analyzing the failure message. The management apparatus further comprises a sender component, in response to the analyzer component determining the failing storage device, for sending a zoning message, the zoning message instructing the storage array to isolate the failing storage device. Finally, the management apparatus further comprises a sender component for sending a protect message, the protect message instructing the storage array to protect data on the failing storage device.

Additional method and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
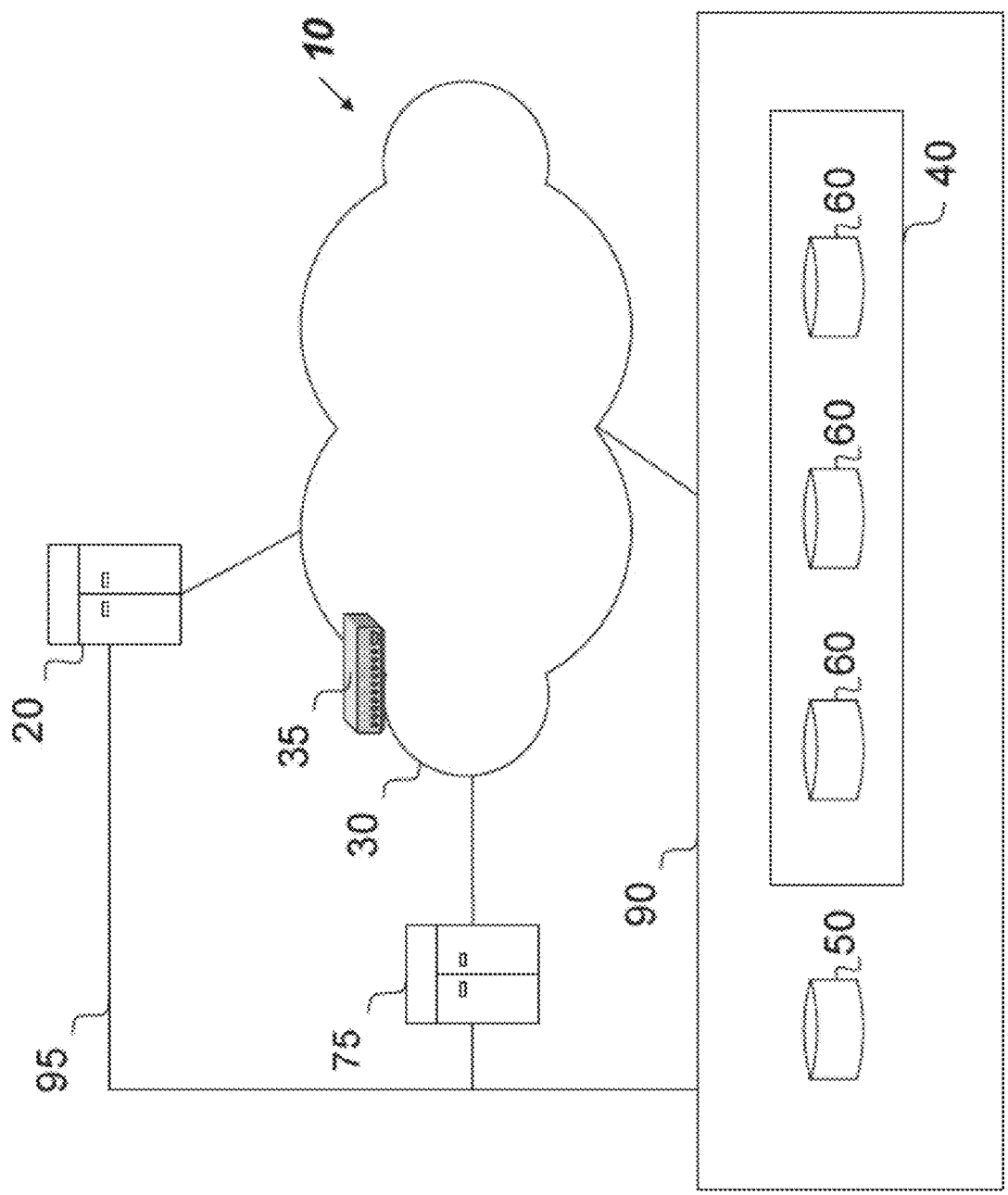
FIG. 1 is a block diagram depicting a data processing system in which the present invention may be embodied.

FIG. 1 is a block diagram depicting a data processing system 10 in which the present invention may be embodied. The illustrated data processing system 10 comprises a server node 20, which is connectable through a network 30 to a back-end storage subsystem 90. A network 30 typically comprises a network device 35, for example a switch, and cabling that connect a server node 20 to a hardware back-end storage subsystem 90. The storage subsystem 90 may comprise a variety of physical storage devices, for example, storage enclosures comprising a Just a Bunch of Disks (JBOD) device 50, or a RAID array 40. The RAID array 40 comprises a plurality of storage devices 60. The data processing system 10 is managed by a management server 75, connectable to the server node 20, the storage subsystem 90, and the SAN fabric devices 31 through the SAN fabric 30 or through a separate Local Area Network (LAN) 95.

A management apparatus is operable within the data processing system 10 processing data available from the networks 30, 95, or from other hardware and software system components within the data processing system 10, for example from a Reliability, Availability and Serviceability (RAS) component (not depicted). One of ordinary skill will appreciate that the management apparatus 600 may be operable in a plurality of components that comprise the data processing system 10, including as an agent within the storage subsystem 90.

Small Computer System Interface (SCSI) is an example of a typical standard for transferring data between computers and storage subsystems. A SCSI initiator, hereinafter called an initiator, is an endpoint that initiates a transaction. SCSI will be used to illustrate a preferred embodiment of the present invention, however, those of ordinary skill in the art will appreciate that the present invention may be implemented by a number of protocols, component variations, and that multiple components may be operable for one or multiple operations associated with the invention.

Figure 2:
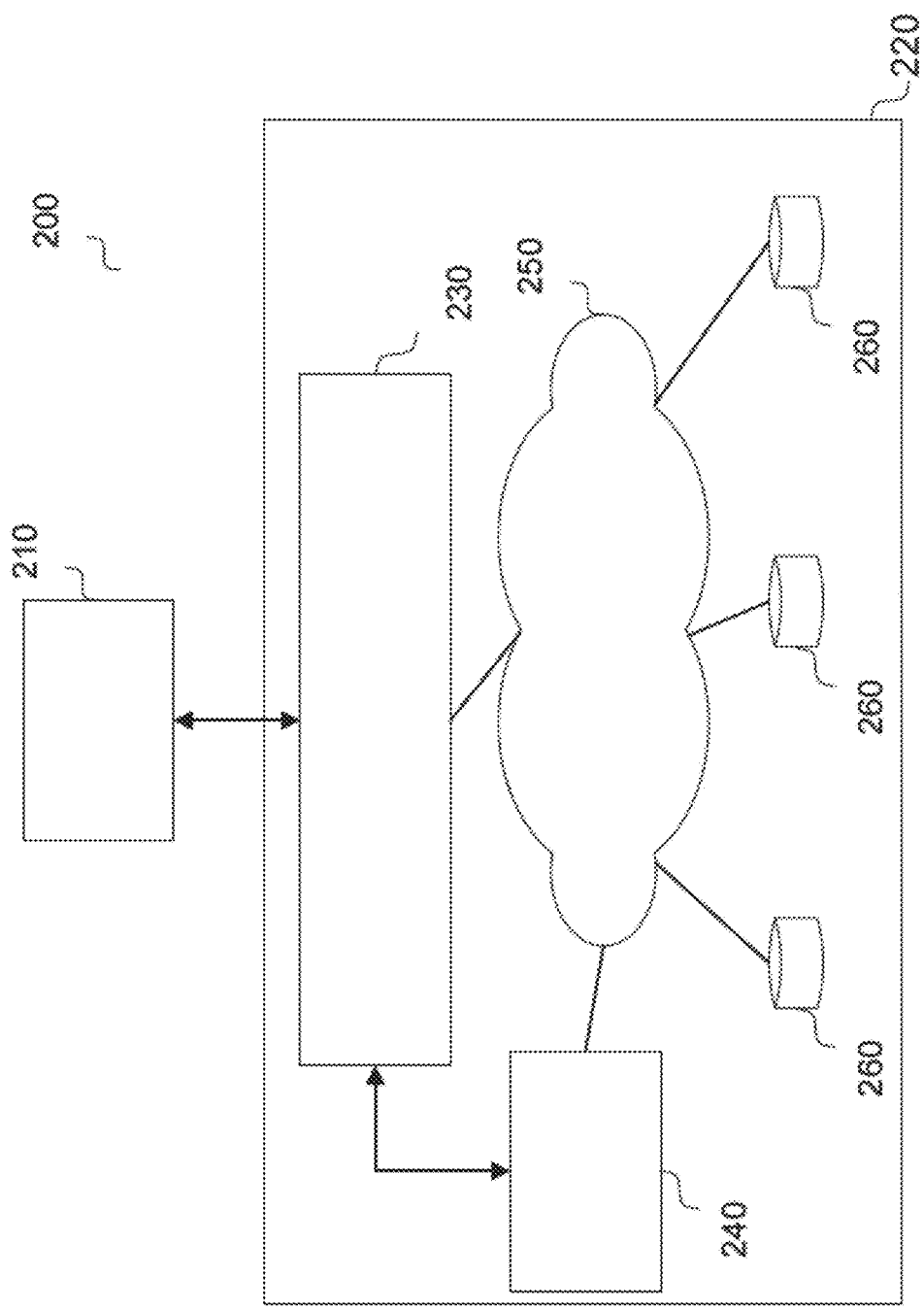
FIG. 2 is a further block diagram depicting a data processing system in which the present invention may be embodied.

FIG. 2 is a further block diagram depicting a data processing system 100, 200 in which the present invention may be embodied. The illustrated data processing system 200 comprises an initiator 210, which is connectable through a network 30 to a storage enclosure 220. The storage enclosure comprises: a switch 230; a SCSI Enclosure Services (SES) node 240; and storage devices 260. The enclosure components are connectable through an internal network 250, as illustrated. Examples of storage devices are disk drives, and tape drives. An SES node 240 is a SCSI node that supports a subset of SCSI commands used by an initiator 210 to control the storage enclosure 220, for example by providing access to control the enclosure power. A plurality of different internal networks 250 is supported by SCSI storage enclosures 220. One example is fibre channel arbitrated loop (FCAL) network, which will be used hereinafter to illustrate a preferred embodiment of the present invention. The initiator 210 controls all read and write accesses to the customer data on the storage devices 260, as it is essential that customer data is controlled at a system level, which the initiator 210 represents. For this reason, the SES node 240 does not have write access to customer data, as is not have a system view.

Figure 3:
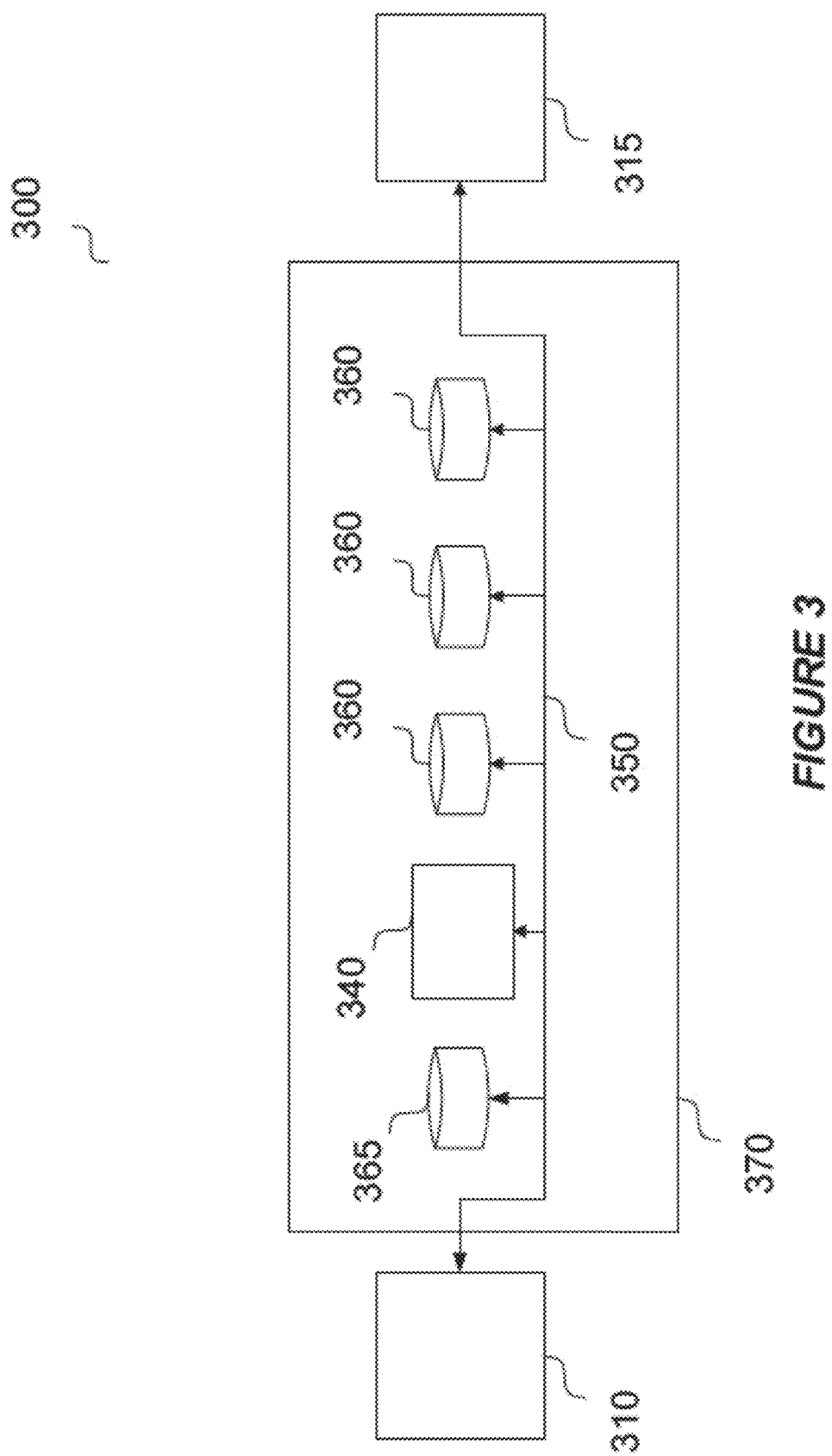
FIG. 3 is an exemplary further block diagram depicting a data processing system in which the present invention may be embodied.

FIG. 3 is an exemplary further block diagram depicting a data processing system 100, 200, 300 in which the present invention may be embodied. The illustrated data processing system 100, 200, 300 comprises initiator A 310 and initiator B 315, which are connectable through internal network 250, 350 to storage devices 260, 360, 365 and also to SES node 240, 340. In the configuration illustrated, initiator A 310 and initiator B 315 are provided for redundancy. Enclosure switch 230 (not depicted) configures initiator A 310, initiator B 315, storage devices 260, 360, 365 and SES node 240, 340 into a SCSI zone A 370. In an alternative embodiment, only one initiator is provided in the configuration.

Figure 4:
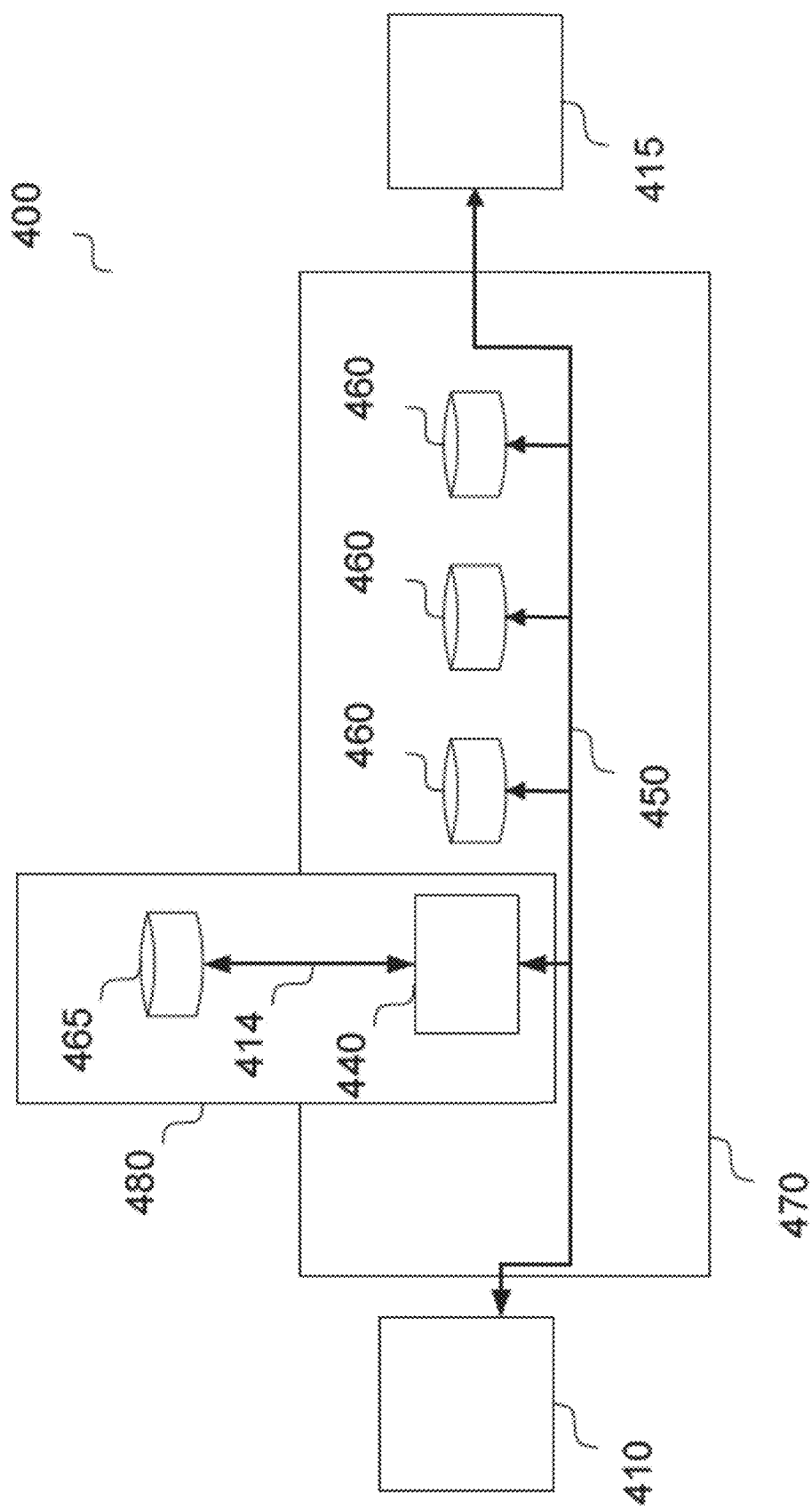
FIG. 4 is a further block diagram depicting the data processing system of FIG. 3 in which the present invention may be embodied.

FIG. 4 is a further block diagram depicting the data processing system 100, 200, 300, 400 of FIG. 3 in which the present invention may be embodied. The illustrated data processing system 100, 200, 300, 400 comprises initiators A 310, 410 and initiator B 315, 415 which are connectable through internal network 250, 350, 450 to storage devices 260, 360, 460 and also to SES node 240, 340, 440. Following a failure of storage device 465, enclosure switch 230 (not depicted) configures initiator A 310, 410, initiator B 315, 415, storage devices 260, 360, 460, and SES node 240, 340, 440 into SCSI zone A 370, 470. The enclosure switch isolates failing device 465 from SCSI zone A 370, 470, by configuring failing storage device 465 and SES node 240, 340, 440 into SCSI zone B 480. Isolation of failing storage device 465 protects the remaining storage devices 260, 360, 460 from adverse effects of the failing storage device 465.

SES node 240, 340, 440 is connectable to the failing storage device 465 through internal network 250, 414. Neither initiator A 310, 410, nor initiator B 315, 415 has direct connectivity with the failing storage device 365, 465. Access to the SES node 240, 340, 440 from initiator A 410 is provided through an internal network 350, 450. In response to a SCSI command from one initiator 310, 410, the SES node 240, 340, 440 sends a further command to the failing storage device 465. Indirect access is also provided for initiator B 315, 415 through initiator A 310, 410 by using internal network 350, 450.

Figure 5:
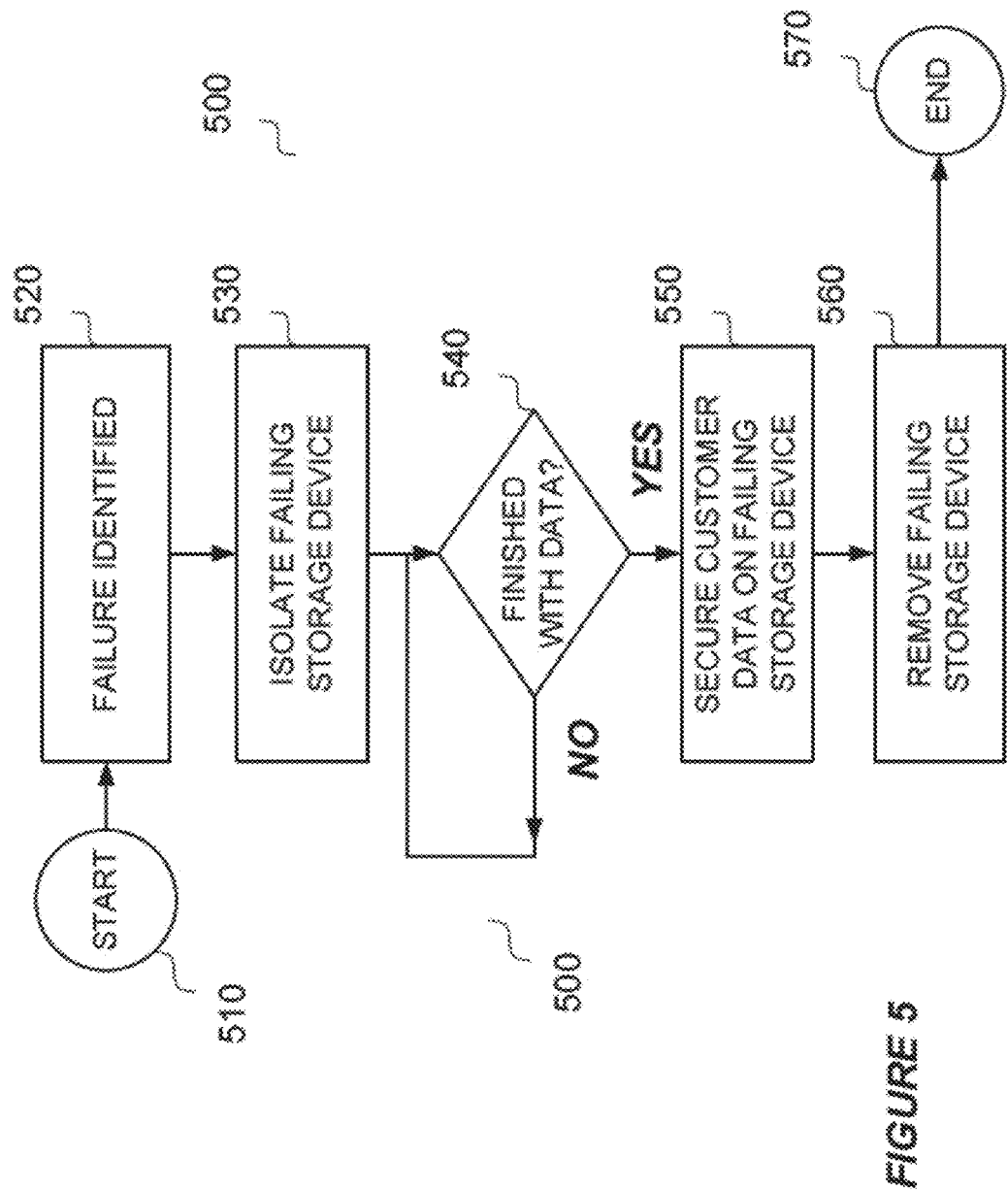
FIG. 5 is a high-level exemplary schematic flow diagram depicting typical operation method steps performed for protecting data on a failing storage device in accordance with a preferred embodiment of the present invention.
Figure 6:
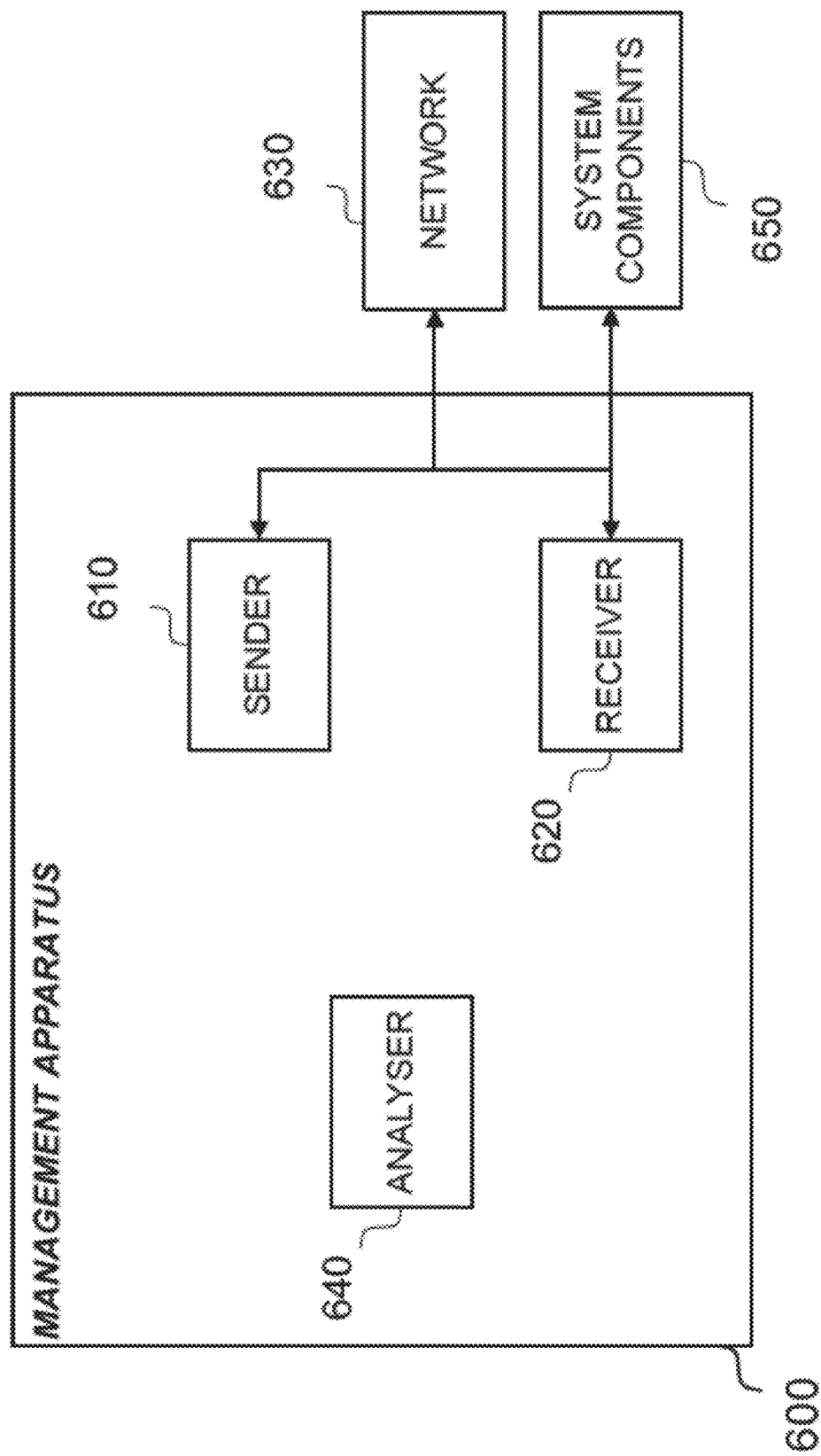
FIG. 6 is an exemplary block diagram depicting a management apparatus in which the present invention may be embodied.

FIG. 5, which should be read in conjunction with FIGS. 4 and 6, is a high-level exemplary schematic flow diagram 500 depicting typical operation method steps performed for protecting data on a failing storage device 465 in accordance with one embodiment of the present invention. FIG. 6 is an exemplary block diagram depicting a management apparatus in which the present invention may be embodied. FIG. 5 is set forth as a logical flow chart diagram. As such, the depicted order and labeled steps are indicative of one embodiment of the presented method. Other steps and methods may be conceived that are equivalent in function, logic, or effect of one or more steps or portions thereof, of the illustrated method. Additionally the format and symbols employed are provided to explain the logical steps of the method and are understood not to limit the scope of the method. FIG. 6 depicts a management apparatus in accordance with one embodiment of the present invention.

Turning to FIG. 5, the method 500 starts at step 510. At step 520, a failing storage device 465 is identified using prior art techniques. A failure message comprising failure information is received by the receiver component 620 of the management apparatus 600 from the network 30, 630, or from other hardware and software system components 650 within the data processing system 10. Exemplary information used to identify a failing storage device 465 includes the storage device medium error rates and key code qualifiers (KCQ) error codes returned by the SCSI storage device 465 to the management apparatus 600. Alternatively, the management apparatus 600 may also detect the number of dropped data frames from the failing storage device 465. Having received the failure information, the management apparatus uses the analyzer component 640 to compare the failure information against predefined criteria. Alternatively, the failure information may comprise information that already specifies that the storage device 465 is failing.

At step 530, as a failing storage device 465 has already been identified, the management apparatus 600 isolates the failing storage device 465 by sending a zoning message specifying a command through the sender component 610 to the SES node 240, 340, 440 through the enclosure switch 230. The command directs the SES node 240, 340, 440 to pass a command back to the enclosure switch 230 to isolate the failing storage device 465 from SCSI zone A 370, 470, and also to establish SCSI zone B 480 containing failing storage device 465 and SES node 240, 340, 440. This fulfils the requirement of removing the bad storage devices from the normal zone but gives access to issue commands to the storage device via the SES node.

Data on the failing storage device 465 may still be recovered under failing conditions. However, this should be achieved without disruption to the storage devices 260, 360, 460 that are not failing. If the storage devices 260, 360, 460, 465 comprise a RAID array, techniques may be used to reconstruct data found on the failing storage device 465, from data on storage devices 260, 360, 460, onto a spare storage device (not depicted) configured into the RAID array. In the event that a medium error is found on a storage device, 260, 360, 460, data corresponding to the medium error may not be reconstructed solely from the storage devices, 260, 360, 460. The spare storage device is marked with a kill sector to designate that data may not be reconstructed. However, data may be recovered from the failing storage device 465 for the kill sector. Failing storage devices 465 may be isolated into a SCSI zone with the SES node 240, 340, 440. In this example, the SES node may be used to read data from the failing storage device 465. It is essential that the integrity of customer data is maintained. Therefore, only initiators are permitted to write data to storage devices, because if multiple components have such permission, there is potential for data written by one initiator to be overwritten by another. Once such data recovery operations are completed, a further message may be passed to the management apparatus.

At step 540, the management apparatus analyses whether the failing storage device 465 is required anymore within in the data processing system 10, and more specifically whether the customer data on the failing storage device 465 requires to be permanently protected. In one embodiment, step 540 is looped until the customer data is no longer required. If the customer data on the failing storage device 465 requires to be permanently protected, control passes to step 550.

Customer data may be protected by either permanently removing access to the customer data, or by permanently removing the customer data. Many storage devices support encryption within the storage device. Data on the storage medium may be encrypted by internal encryption keys stored on the storage device itself. Secure access to the storage device is provided by an external authentication credential encryption key exchange between an initiator and the storage device. For example, when an initiator requires access to a storage device, it may exchange an appropriate external authentication credential encryption key with the storage device. If the exchange is validated, the storage device uses an exchange of internal keys, which are not available externally, to encrypt or decrypt data on the storage device.

One example of encryption is Disk Encryption, as provided by compliance with the Trusted Computing Group™ (TCG) Storage Architecture Core Specification or derivative thereof. Access to encrypted data on storage devices may be permanently removed by cryptographically erasing the storage device that remove the internal encryption keys. Cryptographic erase is also known as 'crypto erase.' Removal is typically achieved by overwriting the encryption keys with a random pattern of data, achieved by generating a new randomly generated encryption key to replace the original one. The operation of overwriting a file is known as 'shredding.' Alternatively, customer data may be permanently removed by shredding the files that contain the customer data. Overwriting gigabits of data, however, will take substantially longer than overwriting the internal encryption keys. However, writing to a failing storage device 465, conflicts with the requirement to rapidly isolate the failing device 465 from the same SCSI zone A 470 that the non-failing storage devices 260, 360, 460 are operating in.

In one, access to customer data is eliminated using crypto erase. At step 550, to protect customer data, the sender component 610 of the management apparatus 600 sends a protect message comprising a command to the SES node 240, 430, 440 through the internal network 450 of SCSI zone A 470. The SES node 240, 340, 440 accepts the command from management apparatus 600 and issues transactions to the failing storage device 465 to complete a cryptographic erase of the failing storage device 465 on SCSI zone B 480. The cryptographic erase requires a secure session to be set up between the failing storage device 465 and the SES node 240, 340, 440. The management apparatus knows the required authentication credentials to start the protect session and passes the external authentication credential encryption key to the SES node 240, 340, 440 in SCSI zone A 470 such that it may open the required session. The SES node 240, 340, 440 does not need to implement any form of authentication key store and may rely on transport from the management apparatus 600 for all external authentication credential encryption key information.

In an alternative embodiment, customer data may be eliminated using various data erase techniques. At step 550, to erase customer data, the sender component 610 of the management apparatus 600 sends a command to the SES node 240, 430, 440 through the internal network 450 of SCSI zone A 470. The SES node 240, 340, 440 accepts the command from management apparatus 600 and issues write transactions to the failing storage device 465 to overwrite the customer data. If the customer data is protected by cryptography, a secure session may be required to be initiated between the failing storage device 465 and the SES node 240, 340, 440. The management apparatus knows the required authentication credentials to start the secure session and passes the external authentication credential encryption key to the SES node 240, 340, 440 in SCSI zone A 470 such that it may open the required session. The SES node 240, 340, 440 does not need to implement any form of authentication key store and may rely on transport from the management apparatus 600 for all external authentication credential encryption key information. At step 560, the failing storage device 465 that now has its customer data permanently protected may be physically removed from the storage enclosure 220. The method ends at step 570.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a compact disc (CD), a digital versatile disk (DVD), a blu-ray disc (BD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A management apparatus operable for protecting data on a failing storage device in a data processing system including a storage array having at least one of a plurality of storage devices, comprising:
    a receiver component for receiving a failure message, wherein the failure message indicates that the plurality of storage devices comprises the failing storage device;
    an analyzer component in communication with the receiver component and responsive to receipt of the failure message, for analyzing the failure message; and
    a sender component in communication with the analyzer component, wherein the sender component is adapted for:
        in response to the analyzer component determining the failing storage device, sending a zoning message, the zoning message instructing the storage array to isolate the failing storage device, and
        sending a protect message including a cryptographic erase command, wherein the protect message instructs the storage array to protect data on the failing storage device.

2. The management apparatus of claim 1, wherein the erase command comprises a storage device write command.

3. The apparatus of claim 1, wherein isolating the failed storage device further comprises zoning the failed storage device in a network with a SCSI enclosure services (SES) node.

4. The apparatus of claim 1, wherein the at least one of the plurality of storage devices is a disk drive.

5. The apparatus of claim 1, wherein the at least one of the plurality of storage devices is a tape drive.

6. The apparatus of claim 1, wherein the sender component is further adapted for initiating a secure session between the sender component and the failing storage device.

7. A method for protecting data on a failing storage device in a data processing system using a processor device, comprising:
    receiving a failure message, wherein the message indicates that the plurality of storage devices comprises a failing storage device;
    responsive to receipt of a failure message, analyzing the failure message;
    determining the failing storage device;
    sending a zoning message, wherein the zoning message instructs a storage array to isolate the failing storage device; and
    sending a protect message including a cryptographic erase command, wherein the protect message instructs the storage array to protect data on the failing storage device.

8. The method of claim 7, wherein sending the erase command comprises sending a storage device write command.

9. The method of claim 7, wherein isolating the failed storage device further comprises zoning the failed storage device in a network with a SCSI enclosure services (SES) node.

10. The method of claim 7, further including initiating a secure session between the sender component and the failing storage device.

11. A computer program product for protecting data on a failing storage device in a data processing system including a storage array having at least one of a plurality of storage devices, the computer program product comprising a non-transitory computer-readable storage medium having computer-readable program code portions stored therein, the computer-readable program code portions comprising:

a first executable portion for receiving a failure message, wherein the message indicates that the plurality of storage devices comprises a failing storage device;

a second executable portion for, responsive to receipt of a failure message, analyzing the failure message;

a third executable portion for determining the failing storage device;

a fourth executable portion for sending a zoning message, wherein the zoning message instructs a storage array to isolate the failing storage device; and a fifth executable portion for sending a protect message including a cryptographic erase command, wherein the protect message instructs the storage array to protect data on the failing storage device.

12. The computer program product of claim 11, further including a sixth executable portion for, pursuant to sending the erase command, sending a storage device write command.

13. The computer program product of claim 11, further including a sixth executable portion for, pursuant to isolating the failed storage device, zoning the failed storage device in a network with a SCSI enclosure services (SES) node.

14. The computer program product of claim 11, further including a sixth executable portion for initiating a secure session between the sender component and the failing storage device.

* * * * *